United States Patent Office 3,126,173
Patented Mar. 24, 1964

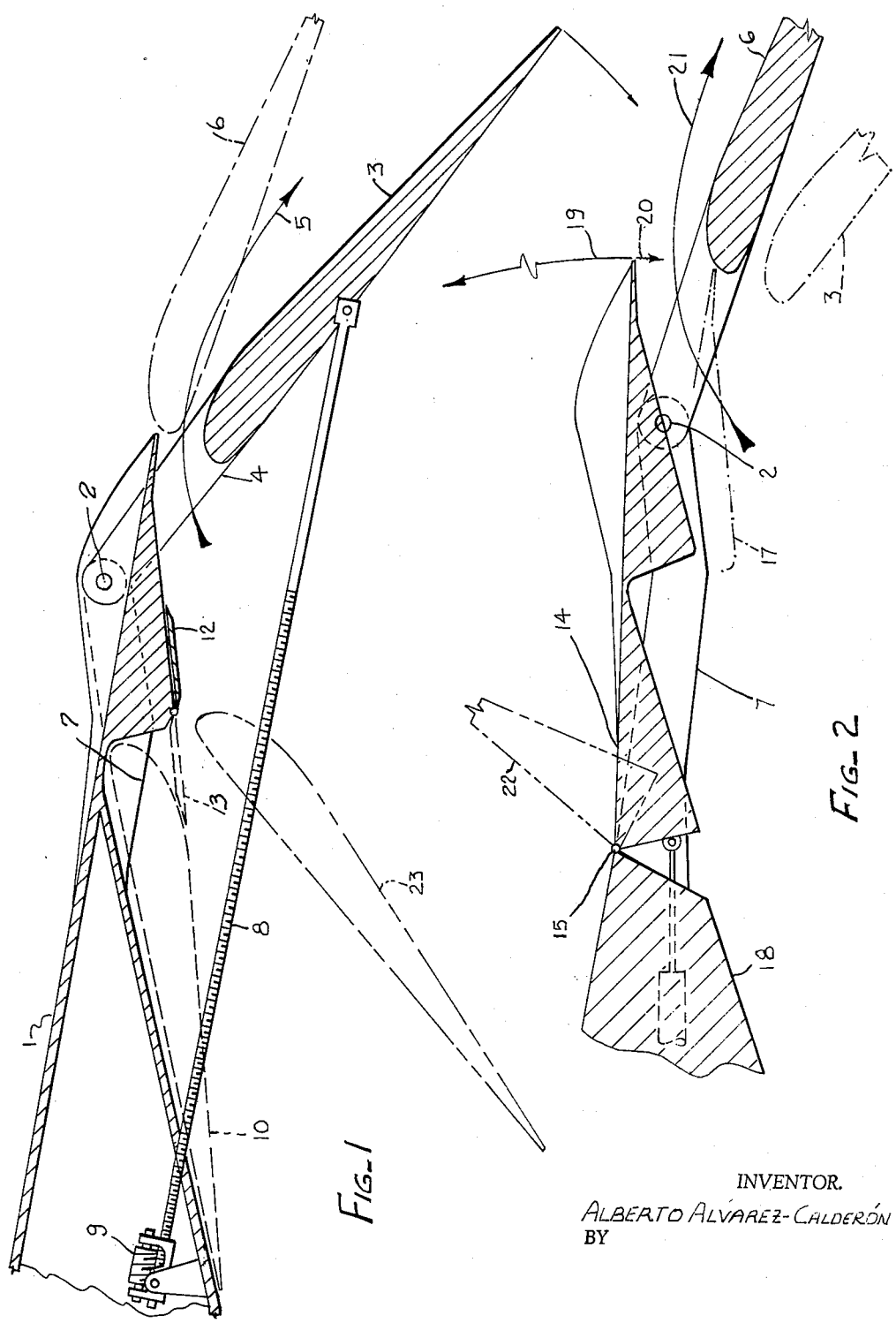

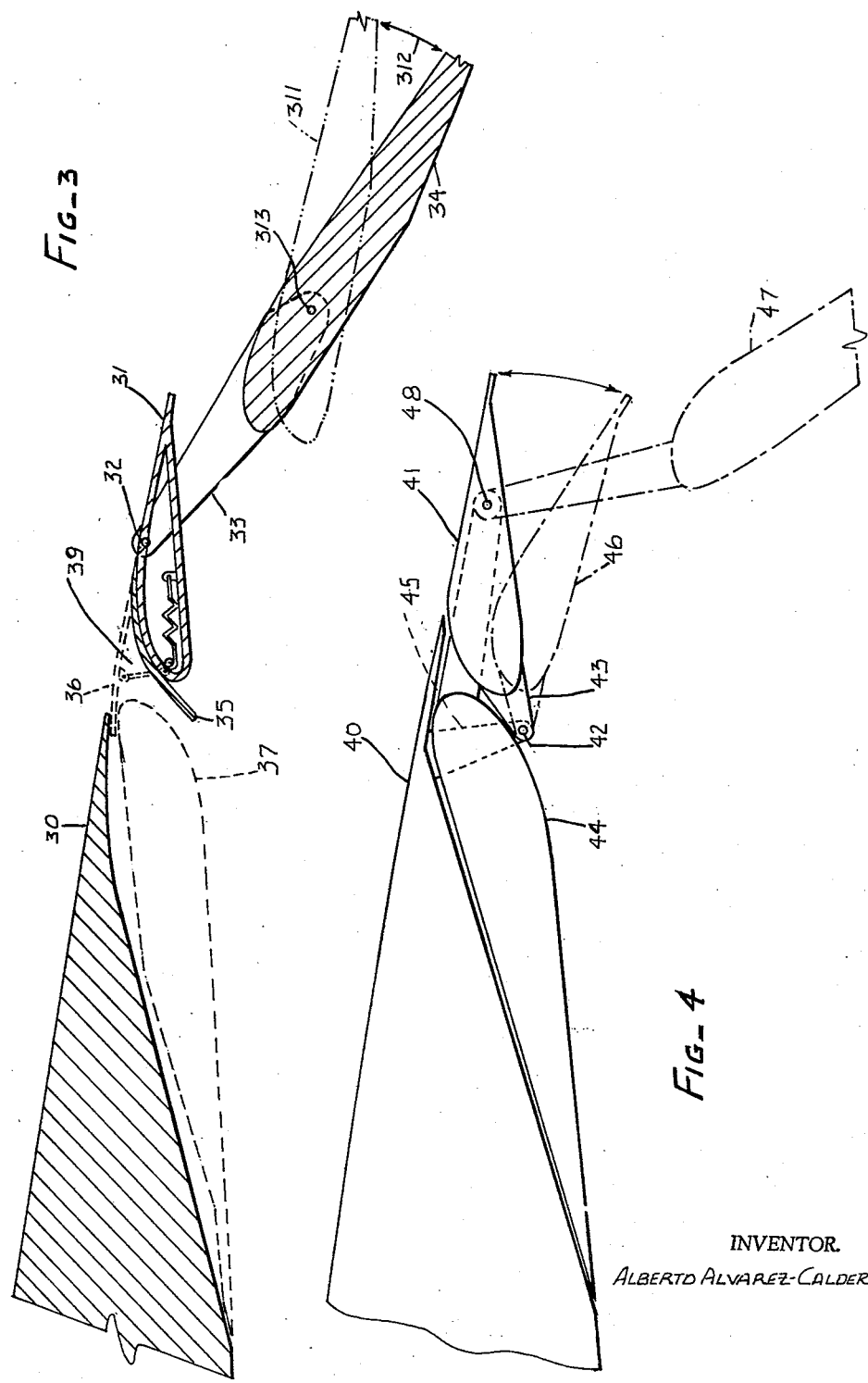

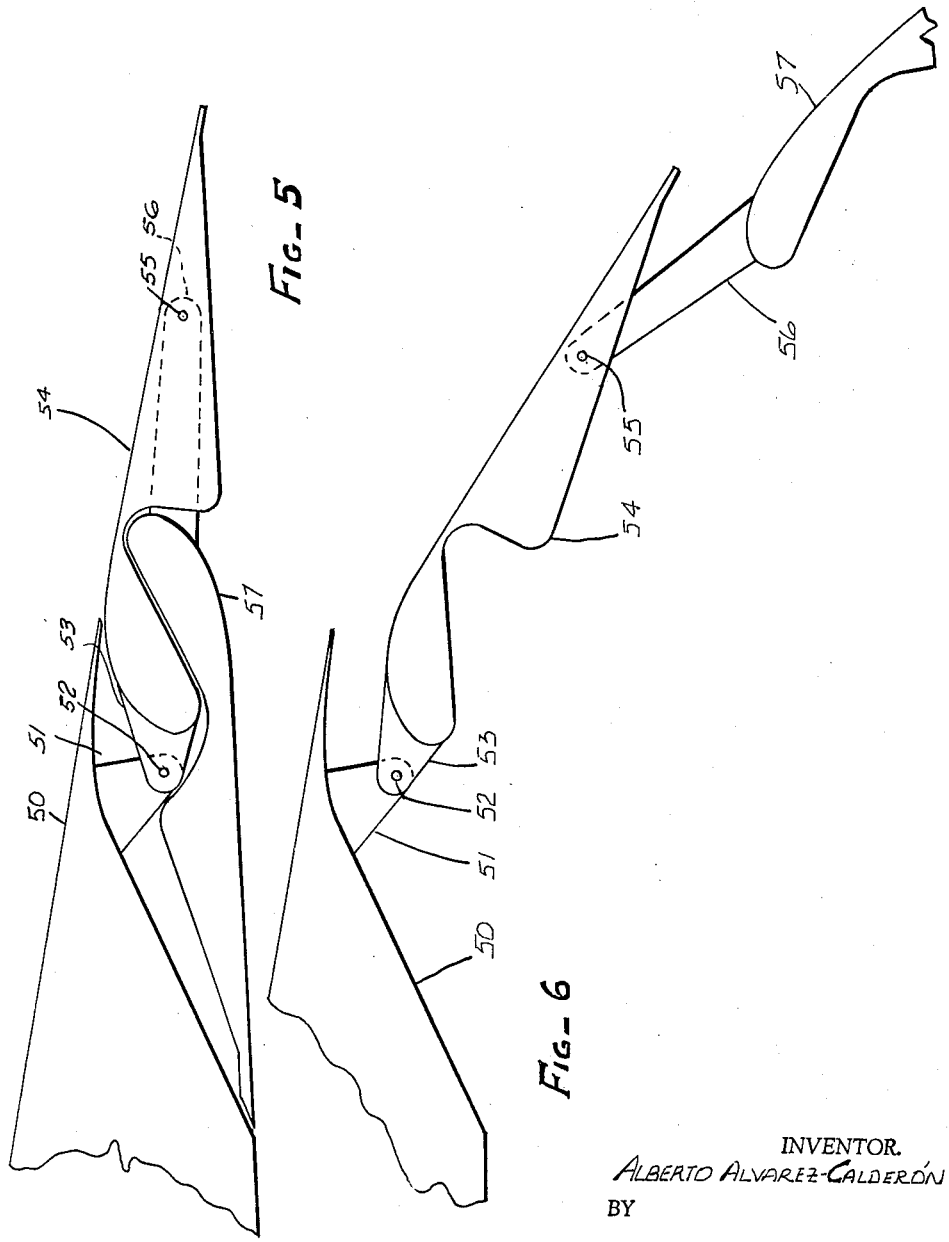

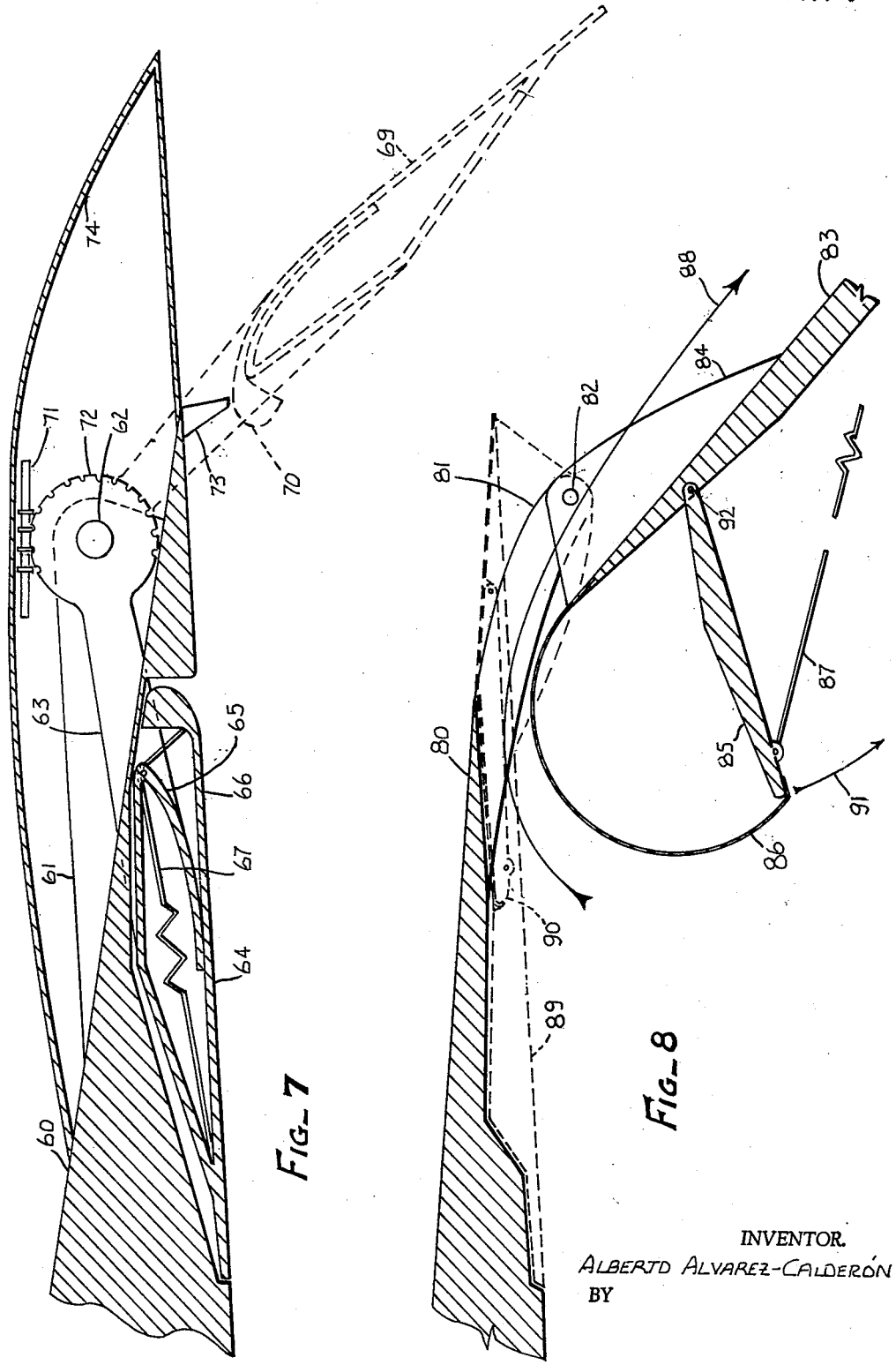

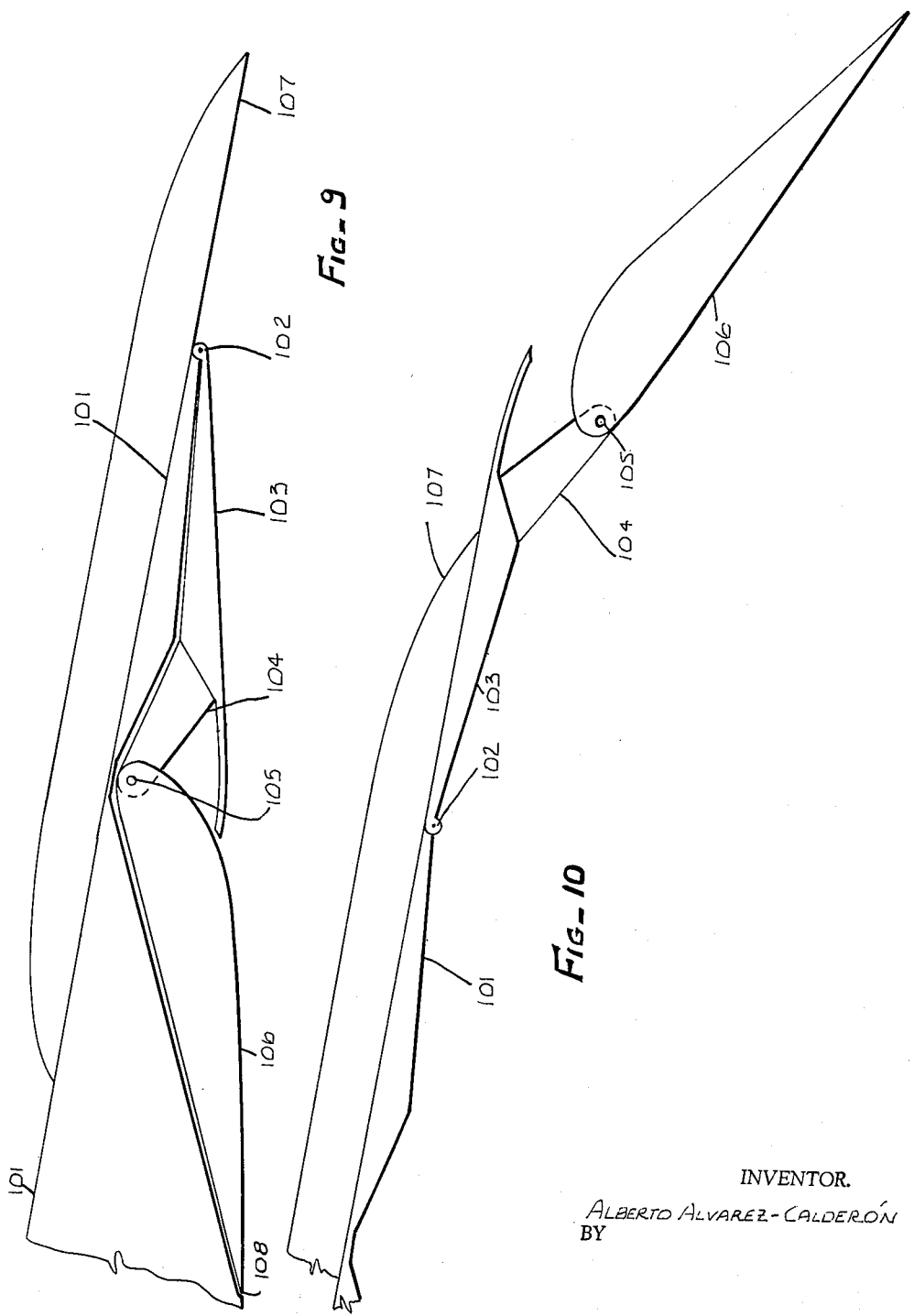

3,126,173
AREA INCREASING SLOTTED FLAPS AND APPARATUS THEREOF
Alberto Alvarez-Calderón, Palo Alto, Calif.
(Ave. Salaverry 3465, Orrantia del Mar, Lima, Peru)
Filed May 21, 1962, Ser. No. 196,164
13 Claims. (Cl. 244—42)

The present invention is related to high lift trailing edge devices. More specifically the invention concerns new and superior structures for slotted chord-increasing trailing edge flaps for aircraft wings.

Trailing edge flaps have been used since the early days of aviation, and extensive theoretical and experimental work exists in this field. A summary of the various types of flaps and their characteristics is available in chapter 8 of the book "Theory of Wing Sections" by Y. H. Abbot and A. E. Von Doenhoff published by Dover Publications, Inc. of New York. Some of the better known types of flaps illustrated in the aforementioned reference are, in the order of increasing aerodynamic efficiency, the plain flap, the split flap, the slotted flap and the slotted Fowler flap. The data shows that the flap with the greatest lift gains is the slotted Fowler flap. This is because the slotted Fowler flap not only changes the camber of the wing and provides a flow and boundary layer re-energizing slot at the flap's bend, but it also substantially increases the wing area by increasing the wing chord.

From the overall aircraft viewpoint, however, the Fowler flaps are not used universally because they require flap tracks for rearward translation and rotation of the flap with respect to the wing. These tracks are heavy, costly and cumbersome. Therefore, only the most efficient and heavy transport aircraft with thick wings use a full Fowler flap with the flap traveling rearwards to the trailing edge of the wing chord. On most aircraft, slotted and split flaps are used because of their simpler structural characteristics. These latter type of flaps usually are simply pivoted spanwise doors hinged at their leading edge directly on the lower wing surface (split flaps) or hinged on external pivoted brackets or tracks (slotted).

In addition to the previously mentioned disadvantages of the Fowler flap, there are other disadvantages which are related to the development of high speed jet aircraft. In this new aircraft in order to avoid adverse compressibility effects, aerodynamics impose the use of very thin wings. These thin wings have an extremely thin trailing edge cross-section in which it is extremely difficult or impossible to house a Fowler flap having an efficient cambered flap cross-section of at least medium thickness. It is also extremely difficult to house the flap tracks of a full Fowler installation and to construct a wing slot lip of sufficient strength and length. These difficulties are discussed in NACA TN 1191, in which it is shown experimentally that in contradistinction with medium thick wing flap data, Fowler flaps on thin wings are not more efficient than slotted flaps. In the past, slotted trailing edge flaps have been constructed with cambered airfoil-shape cross-sections and are positioned for high lift in an upright position to the rear of the main wing and inclined to it. They are arranged for retraction into the wing by various complicated mechanisms to a final position in which the flap is housed below the trailing edge portion of the wing again in an upright position. In my invention I use a cambered slotted flap or secondary airfoil-shaped wing mounted for high lift in an upright position trailing the main or primary wing member in a conventional manner, but to retract my secondary wing member for high speed I flip it over about a simple spanwise connection adjacent to the thick or rounded edge of the secondary wing member by angular motions of the order of 150 degrees to a final inverted and reversed position below the trailing edge portion of the main wing member in which the secondary wing member is smoothly faired with the wing's lower surface. By this new and superior method to be described in greater detail throughout this specification I avoid the complicated flap mechanisms for slotted area increasing flaps. I obtain the structural simplicity of pivoted flaps together with the aerodynamic advantages of the Fowler flap, even for the case of very thin wings. As explained earlier, in my new, ingenious and superior structure the flap is pivoted to the wing's trailing edge at a flap location adjacent to the flap's rounded edge in the flap-extended position as well as in the flap's retracted position (see FIGURE 1 for an illustration of the principle). Also, there is introduced, for very thin wings, the use of a variable cross-section on my improved flap. Additionally, highly efficient self-closing auxiliary flap slot arrangements and volume-saving combinations are obtained by the proper disposition of my new flap as is shown in the specification. Before proceeding with the specification, it is well to note that in the specification the term flap rounded edge refers to what is known in conventional airfoil as a leading or upstream edge. Because of the peculiar kinematics of my system this edge becomes a flap downstream edge when the flap is retracted, therefore the term flap leading edge has been avoided in this specification.

It is one object of this invention to provide a simplified structure for slotted chord-increasing flaps which avoid complicated flap translation and in which the flap and wing are connected to each other adjacent to the downstream edge of the flap and the wing when the flap is retracted.

One more object of the invention is to provide a flap of the type described in which the relative motion of the flap and wing cooperate to close and open additional high lift slots in the flap and wing.

Yet one more object of the invention is to provide a flap of the type described in which the flap itself is articulated to improve the aerodynamic efficiency of the system.

One more object of the invention is to provide a slotted chord-increasing flap of the type described installed on very thin wings and which has an expandable flap leading edge portion, which may be used as a boundary layer control channel if desired.

Yet another object of the invention is to provide a flap structure of the type described which is structurally highly efficient in that the retracting links resist tension forces only.

Yet one more feature of the invention is to provide a flap structure of the type described in which the flap can act with very high efficiency as an aerodynamic drag increasing brake.

One more object of the invention is to provide a flap system of the type described which is highly compact and therefore allows a large wing volume for storage but yet permits a large chord extension for high lift.

These and other objects and features of the invention will become more readily apparent by a perusal of the description of the embodiments of the invention illustrated in the accompanying figures, in which:

FIGURE 1 shows a partial side view of my improved slotted trailing edge flap installed in a wing.

FIGURE 2 shows the structure of FIGURE 1 modified with an auxiliary movable part in the wing to control the size of the slot and to be used further as a spoiler if desired.

FIGURE 3 shows a partial side view of the trailing edge of a wing incorporating my improved slotted flap and a peculiar self-closing second slot on the wing to further improve the lift and drag efficiency of the system.

FIGURE 4 again shows trailing edge portion of a wing incorporating my improved slotted area increasing flap and further modified to incorporate an auxiliary pivoted trailing edge portion in the wing between my slotted flap and the wing.

FIGURE 5 shows in side view a most peculiar arrangement of my slotted flap in combination with a standard trailing edge flap such as to produce a superior mechanism to increase the wing area which is yet of greatly reduced volume when the flaps are retracted.

FIGURE 6 shows the structure of FIGURE 5 in a high lift, low drag position.

FIGURE 7 shows the installation of my improved slotted trailing edge flap incorporated in a thin wing and showing a variable flap camber. The figure also shows a peculiar flap mechanism installed in a compressibility pod in the wing trailing edge.

FIGURE 8 shows the installation of my superior trailing edge flap incorporated to an extremely thin wing suitable for supersonic flight. The flap shows an extendable leading edge portion in the high lift position.

FIGURE 9 shows in cross-section the rear portion of a wing incorporating a modified arrangement of my slotted trailing edge flap in which there is provided an articulated area increasing plate between the flap and the wing trailing edge which together with the flap forms an increment of a wing chord and cooperates with the flap to define an adjacent slot.

FIGURE 9 shows the mechanism in the high speed condition.

FIGURE 10 shows the structure of FIGURE 9 in the high lift condition.

With reference to FIGURE 1, I show therein the trailing edge portion of wing 1 having a support bracket 7 which supports flap 3 at wing pivot axis 2. Flap 3 is connected to pivot axis 2 by means of flap bracket 4 and is shown in the high lift position suitable for landing. It can be seen in the figure that the lower surface of the wing adjacent to its trailing edge together with the smooth edge of flap 3 define the walls of a slot therebetween wherein flow re-energizing air passes rearwardly along path 5 to improve the lift capacity of the system. In position 3 it is seen that my flap has its surfaces trailing the wing's rearmost edge. For takeoff position, my flap may be moved counter clockwise to position 6 in which it forms a continuation of the upper surface of the wing proper and in which it offers little drag.

To retract my flap there is provided a threaded link 8 which is moved relative to the wing by worm 9. Evidently turning worm 9 will rotate flap 3 about axis 2 in a clockwise direction to the final position 10 in which the inferior surface of the flap forms a smooth continuation of lower surface of the wing.

Now that I have described with the aid of a figure the relative position of the flap and the wing and its method of operation, I should like to point out the advantages of the installation as compared to say a Fowler flap. In my system, the displacement of the flap from the retracted position 10 to the high lift position 3 is accomplished by a simple pivotal motion about a fixed axis, the mechanical simplicity of which is mechanically analogous to that of the split flap. In position 3 the flap is disposed with its surface area increasing the chord of the wing. The lip or trailing edge proper of the wing is in its full rearward position, that is, the chord of the wing flaps up and flaps down is the same.

Evidently to accomplish such similar displacement of the flap as shown in the figure by using Fowler's system would require curve flap tracks to accomplish translation and rotation. Thus by comparing the two mechanisms it can be seen what structural advantages are provided by my new system.

In FIGURE 1 there is shown an intermediate flap position 23 which is useful to begin descent from high speed flight to a slower speed and altitude prior to fully extending my pivoted flap to position 3. It is of interest to note that the change of aerodynamic characteristics for a range of flap positions in which the flap is nearly perpendicular to the wing are very small. This is because for this range the flap flow would be stalled in any case. One final detail to be pointed out in FIGURE 1 is the relative position of the chord of the flap with respect to the wing. As can be seen in the flap's up position 10 the thick and smooth edge of the flap is a trailing edge or downstream edge and the thin edge of the flap is an upstream or leading edge. This is the result of the peculiar kinematics of the system but it permits to increase the volume of the fixed wing 1 which is available for storage of fuel, etc. There is shown in position 10 a small discontinuity of surface between the thick edge of 10 and the rearmost portion of the lower surface of the wing. Since this discontinuity is in the pressure side of the airfoil, it does not produce any large increment of drag. Such discontinuities are present anyway for conventional flaps and ailerons. In my system, however, I show an auxiliary door 12 which may be installed if desired in very high speed aircraft to close this discontinuity, moving door 12 to position 13. When the flap is deflected from position 10 to position 3 by virtue of the aforementioned flap kinematics which are evident by inspecting the figure, the thick edge which was a downstream or trailing edge of the flap in position 10 now becomes a leading edge or upstream edge of the flap in position 3. Thus we see that the change of angular orientation of the flap with respect to the wing air flow is greater than 90° and about up to 160°. This wing range of angular orientation of the flap is not present in other flap systems and it is this feature which permits increments of area using only rotation but no translation or sliding of the flap with respect to the wing.

With reference to the mechanism shown to retract and extend the flap, it should be observed that for all extended flap positions the flap resultant force acts below hinge axis 2. Thus link 8 is always acting in tension as is evident by inspection of the figure. Therefore, link 8 can be constructed to be thin and light. Indeed, link 8 could actually be a cable if desired for instance as shown on my auxiliary flap in FIG. 5 of my U.S. patent application 157,422 of December 6, 1961.

So far I have discussed the embodiment of my invention shown in FIGURE 1 in which the slot between the flap and the wing exists for flap deflections of the order of 40°; for the takeoff maneuver the flap is in position 6 in which virtually no slot exists between the flap and the wing, but since the flap deflection is small and around 15°, this is permissible. However in FIGURE 2, I show a modification of the structure of FIGURE 1 which now incorporates an auxiliary articulated trailing edge portion in the wing which serves the double purpose of firstly providing a slot of variable gap between the wing and the flap for any flap position, and secondly it serves to destroy lift if desired by moving this auxiliary portion as a spoiler. As seen in FIGURE 2, there is shown an articulated trailing edge portion 14 supported by axis 15 to the main portion of the wing. Auxiliary 14 can be moved up and down along arcs 19 and 20. When the flap is in takeoff position 6, portion 14 should be placed as shown whereby a slot is formed between 14 and 6 wherein air flows by path 21. The gap between the two walls of the slot should be around 3% of the wing chord.

For landing, auxiliary portion 14 is depressed to dash dot position 17 and the flap is located in dash dot position 3; as can be seen in the figure a new slot is formed therebetween (similar to that of FIGURE 1) which should be a gap of approximately 1½% of the wing chord.

Auxiliary portion 14 can be used to decrease lift, for instance, to provide a downward flight path by a loss of lift or to provide an asymmetric spanwise lift distribution for roll control. When such effects are desired, auxiliary portion 14 should be rotated counter clockwise around axis 15 by path 19 to position 22 whereby large loss of lift and large drag increments results. Auxiliary portion 14 may be operated as a conventional spoiler, for instance by means of a piston actuator 18 or similar device, or by other methods well known in the art.

I will now describe another embodiment of the invention in which the motion of my slotted flap relative to the wing acts in cooperation with the wing structure to open and close a second slot in the wing to further increase the lift characteristics of the system. Specifically, in FIGURE 3, I show the trailing portion of a wing 30 supporting at axis 32 my pivoted slotted flap 34 shown in the high lift position. At the trailing edge of the wing, however, adjacent to axis 32 there is shown a fixed wing slot defined by the lower surface of the wing 30 and by the shape of an auxiliary but fixed portion of the trailing edge proper in the wing which is airfoil shaped and is denoted as 31. Portion 31 is seen to have a movable upper skin 35 connected by means of a spring and cable 36 such as to be adjacent to the forward edge of 31 as shown whereby a slot 39 is formed. We thus see that the structure as described so far forms what is aerodynamically a double slotted flap of high efficiency.

When my flap 34 is retracted by means of clockwise rotation about axis 32 to final position 37, it is evident that the thick rounded edge of 34 will engage plate 35 and move plate 35 with it to an upward plate position 36 when the flap is in position 37, whereby the upper mouth of slot 39 is smoothly sealed and the wing is now a very low drag type. Other features of interest in the arrangement shown in FIGURE 3 are that if flap 34 is placed for takeoff position similar to position 6 of FIGURE 1 slot 39 which is open serves to energize the air flow on the upper surface of the wing and flap for the takeoff position. In this latter position, instead of having a double slotted flap arrangement, the flap operates as a single slotted flap structure and we see that the number of slots can be changed from one to two according to the demands of high lift from takeoff to landing. Another feature of the type of structure of FIGURE 3 is an optional cross-sectional shape of my slotted flap which is thicker than the one shown. In this cross-section, the increased thickness of the flap is favorable both for high lift and for structural lightness and even though it offers a most peculiar bulge in the lower surface of the wing this bulge will not produce a large drag increment because the air flow in the down wind side of the bulge is progressing in a generally favorable pressure gradient and thus any local disturbance will be quickly damped out by the type of flow that exists in that region. An important feature in FIG. 3 is the method by which flap 34 is mounted on bracket 33: a pivotal axis 313 is shown at approximately the flap's quarter chord which permits turning the flap 34 with respect to bracket 33 upwards to a take-off position 311; the slot gap between flap and wing is increased by this flap movement as desired.

In FIGURE 4, I show another embodiment of my invention: an auxiliary flap portion is articulated to the wing in a conventional manner, and the peculiar combination which results can act as a double slotted flap of very high aerodynamic efficiency and relative structural simplicity. Specifically, in FIGURE 4 there is shown the trailing edge portion 40 of a medium thick wing like the NACA 23015 airfoil supporting by means of a trailing edge bracket extension my improved flap 44 at wing axis 48 and by means of flap bracket 45.

Wing 40 also supports an auxiliary portion 41 pivoted to the wing at axis 42 by means of bracket 43. It should be noted that flap 44 is not pivoted to auxiliary portion 41. The structure as described so far has been shown in the high speed low drag condition; to put the flap in the high lift slow speed condition first the auxiliary portion 41 is moved downwards about axis 42 to position 46 in order to provide the drag increment and lift increment to reduce the speed of flight, thence flap 44 is turned counter clockwise in an angular direction opposite to that of auxiliary portion 46, to high lift position 47. It can be seen by inspection that wing 40 auxiliary portion 46 and flap in position 47 determine an efficient high lift double slotted flap arrangement which substantially increases the chord as well as the camber of the wing but in which there is no translation of the components.

In FIGURE 5, I show a similar type of airfoil as in FIGURE 4 but incorporating yet another double slotted arrangement of my improved flap in which the size of the auxiliary pivoted portion is approximately the same as the size of my flap and in which my flap is connected to the auxiliary portion of the wing rather than to the wing itself.

Specifically, in FIGURE 5 I show the trailing edge portion 50 of a wing supporting by means of bracket 51 a pivoted auxiliary flap portion 54 at pivotal axis 52. The upper surface of auxiliary flap 54 is of conventional design but its lower surface exhibits a most peculiar undercambered shape which is evidently necessary for the arrangement shown. My improved slotted area increasing flap 57 is shown to have a cross-sectional shape very similar to that of auxiliary portion 54 and is located with respect to wing 50 and auxiliary flap 54 in an inverted position in which the under-cambered portion of auxiliary flap 54 receives in a mating disposition the thick rounded edge of my flap 57. Observe that flap 57 is connected to auxiliary flap 54 at axis 55 which is not fixed in the wing. The structure described thus far is in the high speed condition. For slow speed flight the flap 57 should be first displaced in a counter clockwise direction about axis 55 by approximately 20° or 30°. Thence the deflection of flap 57 can be increased in a counter clockwise direction and auxiliary flap 54 can be moved in a clockwise direction to a high lift position which will be described in FIGURE 6. FIGURE 6 therefore shows the structure of FIGURE 5 in its camber and chord increasing position in which auxiliary flap 54 is inclined downwardly with respect to the wing by about 20° and with a slot gap of about 2% of the wing chord, and in which my flap 57 is shown also inclined downwardly and rearwardly with respect to the wing and the auxiliary flap having a slot gap between the latter and the rounded edge of 57 of about 2% of the wing chord.

So far I have shown my improved slotted camber increasing flap having a fixed flap camber and flap cross-section. This is convenient for medium thick airfoils of the type shown in the previous figures. However, for thinner airfoils, it becomes difficult for this system as well as for any other flap system to house within the thin wing trailing edge a flap which has a flap camber and flap thickness suitable for high lift. Therefore, I have prescribed in my flap a variable camber and thickness such as to permit the storage of the flap inside the thin wing but yet retain a favorable shape for high lift when the flap is extended. Specifically, FIGURE 7 shows the trailing edge portion of a thin wing 60 (say NACA 64A210 airfoil section) with trailing edge bracket 61 which supports at axis 62 my improved slotted flap 64 shown retracted. It should be observed that flap 64 in addition to having a fixed thin leading edge cross section 65 has an articulated plate 66 with its dependent bulbous leading edge radius connected to flap 64 by means of cable and spring arrangement 67. As seen in the figure the elements described so far have a small cross-section of height which falls inside the contour of thin wing 60 by virtue of the deflection of 66 away from 65. For high lift, flap 64 is moved clockwise around axis 62 to high lift position 69 by a flap moving mechanism say of the type shown in FIG. 1. As soon as flap 64 is separated from and below wing 60 and plate 66 is no longer in contact with wing 60, plate 66 closes against portion 65 of the flap under the action of tension of spring and cable 67. Note that the cable is connected to bulbous edge of 65 and pulls the bulbous edge to a high lift position 70 in which it is seen adjacent to and below the leading edge of my flap in extended position 69, in which it increases the camber and leading edge size of my flap to make an efficient high lift slot and flap arrangement between my flap and the trailing edge of wing 60. The slot gap has a minimum distance fixed by bracket 73 on the wing. It should be observed that the cable and spring device is only one way of accomplishing the camber increase of my flap or the methods known in the art can be used. Alternately a cam mechanism or a fixed plate could be placed vertically at several spanwise stations of the trailing edge of the wing to force a camber change in the flap. Other features of interest in FIGURE 7 are as follows: the flap extending mechanism is seen to be a gear 72 concentric to axis 62 and attached to bracket 63. Spur gear 72 is driven by worm gear 71. Gear 71 can be powered by an electric motor and the whole extending mechanism can be housed inside a streamlined fairing or pod 74 of the type described in U.S. Patent 2,967,030 or 2,950,879.

It should be observed that articulated plate 66 not only serves to decrease the cross-sectional size of the flap in the retracted position as may be evident by comparing the cross-sectional size of flap in retracted position 64 and extended position 69 and realizing that the cross-sectional size 69 with its increased camber and depth could not fit in the shallow wing recession provided in wing 60 to house and fair retracted flap 64 with its decreased camber and depth, but it also serves to smoothly fair the lower surfaces of the wing and retracted flap. I will now describe the application of my slotted flap to an extremely thin high speed wing like the NACA 65–006 airfoil section. Specifically, FIGURE 8 shows a trailing edge portion of high speed wing 80 having a fixed rearwardly bracket 81 which supports at axis 82 a flap 83 by means of flap bracket 84. Flap 83 is shown in the high lift position having a pivoted spanwise door 85 and a membrane extending between the upstream edge of door 85 and the upper edge of flap 83, which membrane 86 can be inflated from within to the circular shape shown in which it defines the extended, rounded and smooth upper edge of my flap 83 as well as the lower surface or wall of the high lift slot between wing 80 and flap 83. Across the slot there flows air by path 88 which air emerges to reenergize the flow to permit high lift values for the area increasing flap. Thus far, the flap has been described in the high lift position as shown by the solid lines; to retract the flap first the spanwise door 85 is rotated about axis 92 in a counter clockwise direction along path 91 and under the action of cable and spring 87. Thence the flap itself is rotated in a clockwise direction about axis 82 to a final position shown in dash lines in which the flap appears as 89 and door 85 is shown as 90. Observe that in this final position the flap itself has its downstream edge to the rear of the downstream edge of the wing proper and the flap can form a smooth sharp trailing edge portion for the wing.

In the structure of FIGURE 8 it may be convenient to divide membrane 86 into few spanwise segments to permit the retraction of the flap system through bracket 81; alternately bracket 81 may be modified such that it lies around and on top of the flap retracted position of the flap whereby it is no longer necessary to divide membrane 86 into several spanwise segments. The methods to construct and operate inflatable tubes for airfoils are well known in the art. See for instance U.S. Patents 2,934,288 and 2,937,288. Obviously a small tube like FIG. 5 of Patent 2,934,288 could be fitted to my flap. These details will not be repeated here. My tube 86 could also be inflated by a flexible hose like that in FIG. 1, Patent 3,064,927. Note that in the structure of FIGURE 8 because of the most peculiar location of the flap wing axis relative to the wing and to the flap itself, a counter clockwise motion of the flap beyond the position shown will evidently increase the gap of the slot between the flap and the wing. This increment of slot gap with the type of flap position change described is most favorable as it cooperates to produce a larger slot gap with a shallower flap deflection. For instance, with a flap deflection of 40° measured in a conventional manner and as shown in the figure, the slot gap is about 1½% of the wing chord. Evidently, turning the flap counter clockwise by about 20° will increase the slot gap to about over 2% of the wing chord. One final detail that should be noted in the structure of FIGURE 8 is that the spanwise membrane 86 together with spanwise plate 85 define the walls of a hollow spanwise channel at the knee between the flap and the wing. This channel can evidently be used to conduct fluids under pressure not only to determine the extended position of the membrane 86 but to discharge said fluid across membrane 86 at the flap knee and in a rearward direction tangentially to the upper surface of the flap such as to provide re-energizing of the boundary layer in the upper surface of the flap. I have shown this type of boundary layer control structure incorporated into an inflatable spanwise channel in my FIGURE 1 of my application 157,423 of Dec. 21, 1961. Evidently by inspection of that figure it can be seen that structure can be incorporated into my flap of FIGURE 8 of this specification and I will therefore not show it here.

So far I have shown my auxiliary slotted camber-changing area increasing trailing edge flap articulated to its supporting wing structure generally adjacent to the trailing edge of the wing but slightly ahead of it and in many cases slightly above or below the wing surfaces. This has permitted the formation of the wing slots as a result of the kinematics of the structure. I will now show other structures which embody my improved area increasing slotted flap. In FIGURE 9 I show elegant and smooth arrangement which serves to substantially increase the chord of the wing and which provides in the high lift position a single slotted flap in which only a portion of it is inclined at an angle to the upper surface of the wing. Specifically FIGURE 9 shows the trailing edge portion of wing 101 extending rearwardly to axis 102 at which position there is articulated a lower plate surface 103 which actually forms part of the flap system and lies below wing 101. Plate 103 itself has a bracket 104 which supports at axis 105 my slotted camber-increasing flap 106 shown retracted. The structure as described so far is in the high speed condition and it can be seen that it has extremely smooth surfaces suitable for high speed flight. It also shows an optional external fence 107 in a chordwise direction which has a structural purpose which will be described in connection to FIGURE 10 in which the structure of FIGURE 9 is shown in the high lift position. Before describing FIGURE 10, however, I would like to specify one method of extension of my flap system of FIGURE 9 from its high speed position to its high lift position. This method of extension is as follows: plate 103 is rotated counter clockwise about axis 102 by about 45° and flap 106 is rotated with respect to plate 103 also about 45° in a clockwise direction but with edge 108 of my flap 106 remaining in contact with the lower surface of wing 101. This alternate position results in a V-shaped bulge below the wing which serves to increase drag and increase lift such as to reduce airplane speed. The contact of edge 108 with the lower surface of wing 101 can be arranged by means of auxiliary track or a follower of the type known in the art for slotted flaps. When the aircraft's speed is decreased substantially then additional counter clockwise motion of plate 103 is prescribed until it arrives to position parallel to the upper surface of the wing 101 and which is shown in FIGURE 10. With reference then to FIGURE 10 it is seen that plate 103 is resting against the extension of fence 107 such as to provide a simple structural support for the load supported by plate 103 and to transmit this load to the wing. Flap 106 can be now moved in a counter clockwise direction with respect to plate 103 to the position shown in FIGURE 10 in which the slight curved edge of the plate 103 together with the thick rounded edge of flap 106 define a high lift slot therebetween which provides very high lift efficiency. It is of interest to note that the increment of chord of the structure of FIGURE 9 is about 30% of which 15% is produced by plate 103 and another 15% by flap 106. This very large chord increment can be accomplished with an efficient structure in which there is no translation of the parts and which occupies very little volume in the wing itself. Evidently the components of the parts of the flap can be increased further, for instance, by extending plate 103 such as to further increase the increment of wing chord with flap extension.

Several methods to operate and move the flaps have been described in the specification. Evidently there are alternate mechanisms that can be used, for instance, flap 23 in FIGURE 1 could be connected to wing 1 such as to have a partial rearward translation of the flap in the flap retracted position prior to its counter clockwise rotation prescribed in that figure. By such an arrangement in which the flap actually is displaced rearwardly in a manner similar to the Fowler flap system, the increment of wing chord would have two components, one due to my area increasing mechanism shown in the figure and another due to the superposed Fowler-like rearward translation.

Also, there are several other mechanisms other than the ones suggested or complementary to the ones suggested which may be utilized to actuate the flaps as shown in the specification. For instance, see U.S. Patents No. 2,115,225 of April 26, 1938, No. 2,041,688 of May 26, 1936, No. 2,252,656 of August 12, 1941, No. 2,156,403 of May 2, 1939 and all the patents of sub-class 42 of class 244. Also, with specific reference to FIGURE 8, the tubular structure shown by membrane 86 may be constructed and operated according to U.S. Patents No. 2,912,190 of November 10, 1959 or No. 2,937,826 of May 24, 1960 or No. 2,851,229 of September 9, 1958. It is important to note that the objectives of the invention are accomplished when the flaps are constructed to the approximate proportions shown and are installed and operated according to the kinematics and relative positions shown in the specifications. This permits the large lift increments, low drag, low volume storage and simple type of mechanism which is characteristic of the invention. In the figures it should be understood that the various mechanisms and flap elements which are shown in any one structure are also applicable to the other embodiments of the invention. For instance, member 117 of FIG. 11 should be moved with a threaded link like 8 of FIG. 1; flap bracket 33 of FIG. 3 may be moved also with a similar threaded link. The drawings have been made with care and incorporating by way of illustration but not of limitation the contours of wing sections which are presently used in aircraft. The scale used in the drawings is one inch equals four percent of wing chord; the type of airfoil shown by way of illustration are: FIGURES 1 and 2 NACA 64A212, FIGURE 3 NACA 2412, FIGURES 4 and 5 NACA 23015, FIGURE 7 NACA 64A210, FIGURE 8 NACA 65006, FIGURES 9 and 10 NACA 230015.

Details concerning links, bearings, valves, pistons, etc. are available in the specifications and/or in the publications of reference and are also available to anyone in the art and familiar with the construction and operation of flaps and airplanes.

While the system described so far has been referred to trailing edge flaps of wing, it is evidently also applicable for ailerons, elevators and rudders of aircraft and ground effect machines and all similar vehicles in which the direction of a fluid is being turned. It is of course applicable to hydro-foil surfaces and other hydro-dynamic applications.

Various further modifications and illustrations from those described hereinbefore can obviously be made without departing from the spirit of this invention and the foregoing are to be considered purely as exemplary applications thereof. The actual scope of this invention is to be indicated by reference to the appended claims.

I claim:

1. An airfoil-shaped primary wing member having an upper surface and a trailing edge portion with a generally spanwise trailing edge and an undersurface adjacent to said trailing edge, and a secondary airfoil-shaped wing member trailing said primary wing member and having a first spanwise edge portion with a rounded surface adjacent and substantially parallel to said trailing edge and a second spanwise edge portion to the rear of said first edge portion and means provided to move said secondary airfoil-shaped wing member with respect to said primary wing member between a trailing position in which the undersurface of said trailing edge portion and said rounded surface of said first edge portion define contracting walls of a principal high lift slot between said primary and secondary wing members for rearward fluid flow therethrough from below said primary wing member to on top of said secondary wing member and a retracted position in which said secondary wing member is positioned faired with and adjacent to said primary wing member below said upper surface in an inverted disposition in which said secondary wing member is approximately parallel to said primary wing member with said first edge portion adjacent to said trailing edge of said primary member and said second edge portion forward from said first edge portion and adjacent to said undersurface of said primary wing member.

2. The structure of claim 1 characterized further in that said secondary wing member is pivotally mounted on said primary wing member at a generally spanwise pivotal axis adjacent to said trailing edge portion of said primary wing by means of a generally chordwise flap bracket protruding from said first edge portion of said secondary wing member in a direction away from said second edge portion of said secondary wing member.

3. The structure of claim 2 characterized further in that said means to move said secondary wing member comprises a tension member extending in a generally chordwise direction below said pivotal axis from said secondary wing member to said primary wing member and means provided to withdraw said tension member into said primary wing portion.

4. The structure of claim 1 characterized further in that said primary wing member has an auxiliary wing member adjacent to said trailing edge portion and with a portion of said auxiliary wing member defining said trailing edge and said under-surface of said primary wing member, with at least a portion of said auxiliary wing member being movable with respect to said primary wing member downwardly to a position in which the adjacent surfaces of said primary and auxiliary member define the walls of an auxiliary slot therebetween for fluid flow through said auxiliary slot, said auxiliary slot being located approximately parallel to said principal slot.

5. The structure of claim 4 further characterized in that said auxiliary wing member has an airfoil shaped cross-section with said movable portion being an upper forward skin, and means are provided to move said upper forward skin between a first skin position in which said skin closes smoothly the fluid ejecting mouth of said auxiliary slot when said secondary wing member is in said retracted position, and a second skin position below said first skin position in which said auxiliary slot is open and said skin forms the lower wall of said auxiliary slot.

6. The structure of claim 4 further characterized in that said secondary wing member is pivotally connected to said primary wing member and in that said auxiliary wing member has an airfoil-shaped cross-section and is connected to the remainder of said primary wing member for movement with respect thereto between a low drag position in which said auxiliary slot is closed and said auxiliary wing member is to the rear of said secondary member in said secondary member retracted position, and a high lift position in which said auxiliary slot is formed at the upstream spanwise edge portion of said auxiliary wing member upstream of said principal slot and said auxiliary member is upstream of said secondary member in said secondary member trailing position.

7. The structure of claim 1 characterized further in that said primary wing member has an airfoil-shaped auxiliary wing member mounted on the trailing edge portion of said primary wing member defining said trailing edge and at least a portion of said adjacent undersurface of said primary wing member and capable of motion with respect to said primary wing member to include a neutral auxiliary member position trailing said primary wing upper surface when said secondary wing member is in said retracted position and a lift increasing auxiliary member position in which said auxiliary member is inclined to said primary wing member with the surfaces of said primary wing member adjacent to said auxiliary member and the upstream portion of said auxiliary wing member defining walls of an auxiliary slot for rearward fluid flow ahead of said trailing edge, and in that said secondary airfoil member is mounted on said auxiliary member of said primary wing member.

8. The structure of claim 7 characterized further in that said auxiliary wing member is pivotally connected to said primary wing member by an approximately spanwise pivotal axis and said secondary wing member is pivotally connected to said auxiliary wing member by a second pivotal axis approximately parallel to said spanwise pivotal axis, and in that the relative disposition of said wing members include a high speed disposition in which said auxiliary wing member is in said neutral position and said secondary wing member is in said retracted position with the leading edge portion of said auxiliary wing member overlapping and generally on top of and mating said first edge portion of said secondary wing member, and a high lift position in which said secondary wing member is trailing said auxiliary wing member and inclined downwardly with respect to said auxiliary wing member with said first edge portion of said secondary wing member placed below the downstream edge of said auxiliary wing member.

9. The structure of claim 1 characterized further in that said rounded surface of said first spanwise edge portion is movable with respect to said secondary wing member between a high lift position of increased secondary member camber when said secondary member is in said trailing position and a low drag position of decreased secondary member camber when said secondary member is in said retracted position.

10. The structure of claim 9 further characterized in that said rounded surface in said secondary wing member comprises a generally spanwise inflatable tube which is adapted to be inflated when said secondary wing member is in said trailing position and is adapted to be deflated when said secondary wing member is in said retracted position.

11. The structure of claim 1 further characterized in that said primary wing member has an auxiliary wing member mounted on the trailing edge portion of said primary wing member capable of motion with respect to said primary and secondary wing members between a first auxiliary member position in which said auxiliary member defines the trailing edge and adjacent undersurface of said primary wing member and is located at the rear of said trailing edge portion and approximately parallel to said upper surface when said secondary wing member is in its trailing position, and a second auxiliary member position in which said auxiliary member is inverted from said first position to a second position in which said auxiliary member is placed in an inverted position below said trailing edge portion of said primary wing member and to the rear of said secondary wing member when said secondary wing member is in its retracted position.

12. The structure of claim 2 further characterized in that said trailing edge portion of said primary wing member has a movable portion which defines one wall of said principal slot with said movable portion capable of angular motion with respect to said primary wing member to change the size of said slot when said secondary wing member is in said trailing position between a first position in which the upper surface of said movable portion is substantially parallel to said upper surface of said primary member adjacent to said movable portion, and a second position in which said movable portion is inclined to said upper surface of said primary wing member.

13. The structure of claim 1 further characterized in that said secondary wing member has a main portion and a dependent portion including said first edge, said dependent portion being capable of movement with respect to said main portion about a spanwise axis of articulation connecting said main and dependent portions between a high lift position in which said main portion is substantially entirely downstream to the rear of said dependent portion when said secondary member is in said trailing position, and a low drag position in which said dependent portion is on top of said main portion when said secondary member is in said retracted position, with said spanwise axis of articulation located at substantially the downstream edge of said retracted secondary wing member.

14. The structure of claim 2 further characterized in that said secondary wing member is mounted on said bracket for movement of said secondary member with respect to said bracket about a second spanwise axis connecting said secondary member and said bracket, with said second spanwise axis located between and approximately parallel to said first and second spanwise edges of said secondary wing member.

15. The structure of claim 8 further characterized in that the crossectional shape of said secondary and auxiliary wing member is airfoil shaped with one surface of each of said auxiliary and secondary members having a concave channel of relatively large depth, and in that the relative position of said auxiliary and secondary wing members in said high speed disposition is such that said leading edge of said auxiliary member is accommodated mating said concave channel of said secondary member, and the first edge of said secondary member is accommodated mating said concave channel of said auxiliary wing member.

16. The structure of claim 10 characterized further in that said secondary wing member is connected to said primary wing member by a pivotal generally spanwise axis located below and adjacent to said undersurface of said primary wing member.

17. The structure of claim 11 further characterized in that said primary wing portion has a chordwise beam extending rewardly beyond and approximately parallel to the upper surface of said trailing edge portion of said primary wing member to restrain upward movement of said auxiliary member in said first auxiliary member position and in that said auxiliary wing member is substantially flat and has a spanwise connected edge pivoted to said primary wing member ahead of the downstream end of said beam and a spanwise free edge with a chordwise bracket extending therefrom and supporting said secondary wing member for pivotal motion of said secondary wing member with respect to said auxiliary wing member.

18. An aircraft wing with a trailing edge portion and a trailing edge and a movable airfoil shaped trailing edge flap with a rounded spanwise edge portion, with said flap mounted on said trailing edge portion of said wing for movement between a high-lift flap position in which said flap is to the rear of said trailing edge portion and inclined downwardly with respect to said wing with said rounded spanwise edge portion adjacent to said wing trailing edge and defining, together with the undersurface of said trailing edge portion, converging walls of a high lift slot therebetween to direct fluid flow from below said wing smoothly across said slot and downwardly on top of said flap, and a low drag position in which said flap is faired with said wing nested in said trailing edge portion in an inverted flap position with said flap rounded edge adjacent to said wing trailing edge.

References Cited in the file of this patent

UNITED STATES PATENTS

| | | |
|---|---|---|
| 1,841,804 | Hall | Jan. 19, 1932 |
| 1,893,065 | Zaparka | Jan. 3, 1933 |
| 2,609,167 | Gero | Sept. 2, 1952 |

FOREIGN PATENTS

| | | |
|---|---|---|
| 332,892 | Great Britain | July 28, 1930 |